R. C. DOUGAN.
CULTIVATOR.
APPLICATION FILED OCT. 9, 1911.

1,041,447.

Patented Oct. 15, 1912.

2 SHEETS—SHEET 2.

WITNESSES
F. C. Barry
C. E. Trainor

INVENTOR.
Robert C. Dougan
BY Munn & Co.
ATTORNEYS

UNITED STATES PATENT OFFICE.

ROBERT CALVIN DOUGAN, OF MILLERSBURG, OHIO.

CULTIVATOR.

1,041,447.   Specification of Letters Patent.   Patented Oct. 15, 1912.

Application filed October 9, 1911. Serial No. 653,700.

*To all whom it may concern:*

Be it known that I, ROBERT C. DOUGAN, a citizen of the United States, and a resident of Millersburg, in the county of Holmes and State of Ohio, have invented a new and Improved Cultivator, of which the following is a full, clear, and exact description.

My invention is an improvement in cultivators, and has for its object the provision of a simple, inexpensive device of the character specified, which will thoroughly work up and disintegrate the soil, and wherein means are provided for guiding or steering the cultivator as it is drawn through the field.

Figure 1:
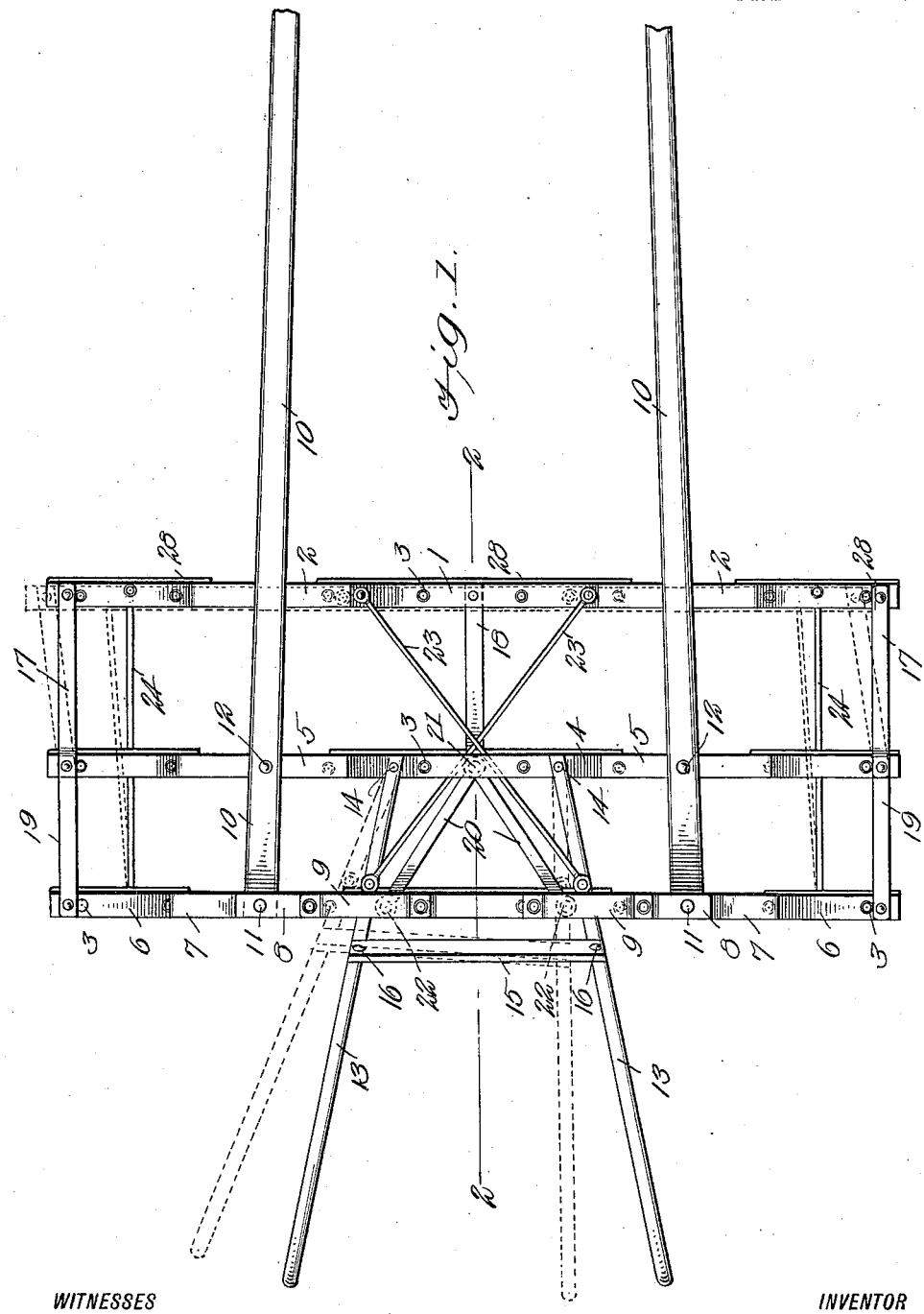
Figure 2:
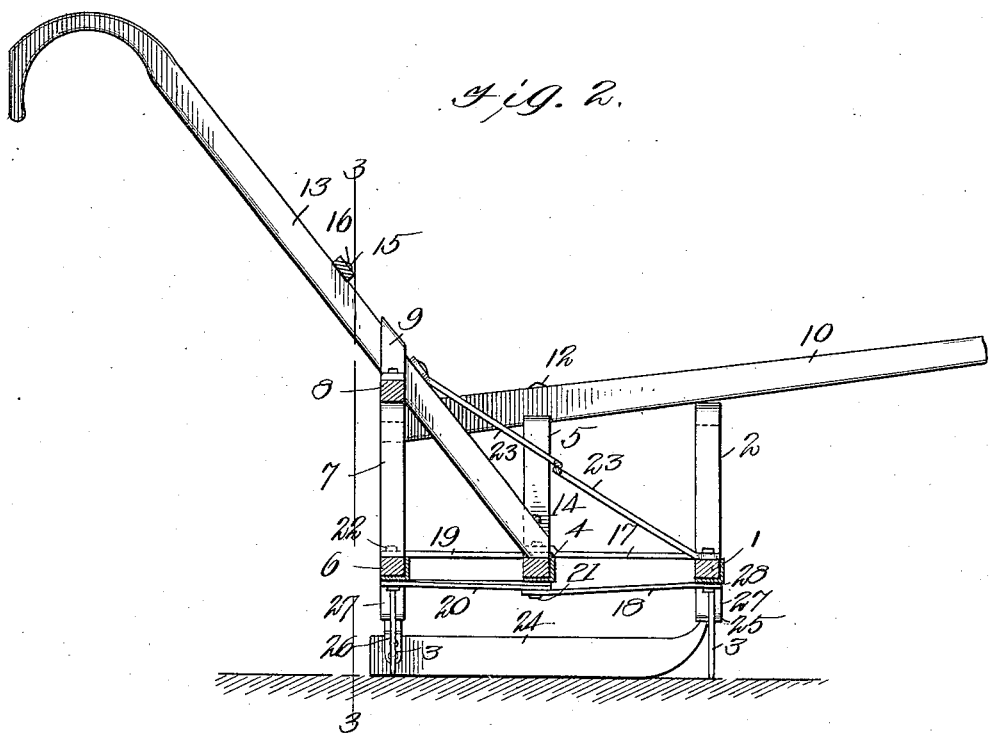
Figure 3:
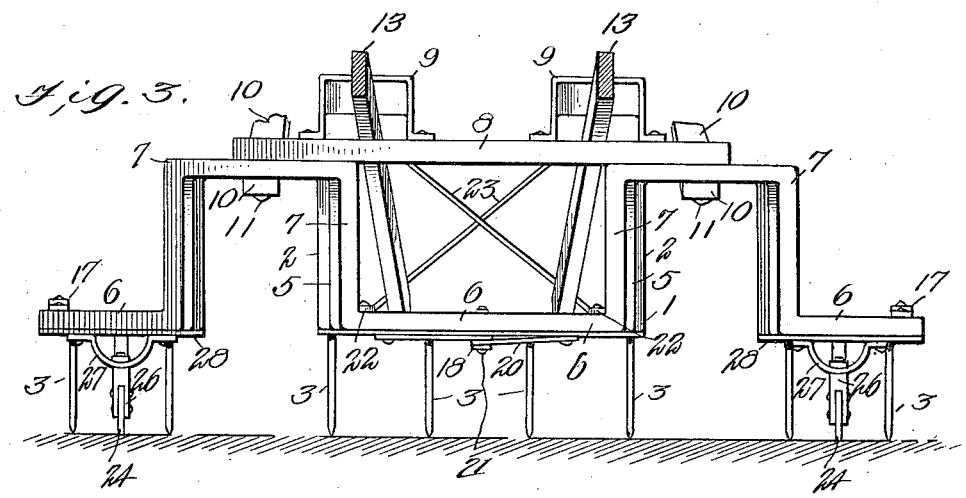

In the drawings:—Figure 1 is a plan view of the improvement; Fig. 2 is a section on the line 2—2 of Fig. 1, and Fig. 3 is a section on the line 3—3 of Fig. 2.

In the present embodiment of the invention, a plurality of transverse bars are arranged in spaced relation and substantially parallel, and each bar is provided with teeth. The front bar 1 is provided near each end with an arch or upwardly offset portion 2, and the teeth 3 are connected with the main portions of the bar.

The second bar 4 is similar to the bar 1, having the arches or upwardly offset portions 5, and the teeth 3 connected with the main portions of the bar. The rear bar 6 is also provided with the arches 7, and with the teeth 3 and the arches 7 are connected by a plate 8.

The plate 8 is secured at each end to an arch 7, and a stirrup hanger 9 is secured to the plate 8 near each end thereof. A shaft 10 is pivoted to the under surface of each arch 7, as indicated at 11, Fig. 3, and each shaft extends forwardly over the adjacent arches 2 and 5 of the bars 1 and 4. Each shaft is also pivoted to the adjacent arch 5, as indicated at 12, and the shafts converge slightly toward their front ends. A handle 13 is connected to the bar 4 near each of the arches 5, as indicated at 14, and on the inner side of the arch, and each handle extends rearwardly through the adjacent stirrup 9.

The handles are connected by a cross bar 15, behind the frame, the said bar having one end pivoted to each handle, as shown at 16. The bars 1 and 4 are connected at their ends by straps 17, and at approximately their centers by a strap 18, the straps 17 being pivoted to the upper faces of the bars and the strap 18 to the lower faces thereof.

The bars 4 and 6 are connected at their ends by straps 19, similar to the straps 17, and other straps 20 connect the said bars intermediate their ends. The straps 20 are pivoted at their front ends on a common bolt 21, the said bolt also connecting the strap 18 to the bar 4. The said straps 20 diverge toward their rear ends, which are pivoted to the bar 6 at the adjacent hanger 9, as indicated at 22.

A pair of links 23 connect the central portion of the bar 1 to the handles 6. Each link is pivoted to the bar 1 near an arch 2, and on the inner side thereof. The links are crossed, and the rear end of each link is pivoted to a handle 13, near a hanger 9.

A guide runner 24 is arranged at each end of the frame, each runner having its front end upturned, as indicated at 25, and pivotally connected to the bar 1, near the adjacent end. A stirrup 26 is secured to the rear end of each runner and each stirrup is secured to a hanger 27 connected to the bar 6.

It will be noticed, that the front bar 1 is mounted to swing laterally of the frame by means of the handles 13. When the said handles are swung from the full to the dotted line position of Fig. 1, the links 23 swing the said bar 1 in the same direction as the handles, thus changing the position of the runners 24. When the position of the runners is changed as mentioned, the frame is steered or guided in the direction in which the handles are moving. When the handles are moved laterally, as described, a like result follows with respect to the shafts, on account of the manner in which the shafts are mounted. The shafts swing on the pivots 12.

The front bar is provided at each end, and at its center with reinforcing angle plates 28, each plate having one side in front of the bar, and the other side below the same, Figs. 1 and 2. A tooth 3 is arranged directly in front of each runner. The said tooth opens a furrow for the runner, Figs. 1 and 2.

In operation the cultivator is drawn through the field by means of a draft animal in the shafts. The teeth 3 thoroughly work up the ground, and by swinging the handles, as indicated by dotted lines in Fig. 1, the position of the guide runners can be changed to guide or steer the frame to one side or the other. The frame is always guided in the direction in which the handles are swung.

The straps 20 form a brace or truss between the central bar and the rear bar, and prevent swinging of the said bars with respect to each other, so that the handles act directly on the front bar. The teeth of each bar are staggered with respect to the teeth of the other bars. The handles are constrained to move together by the bar 15 that connects them.

It will be obvious that other draft apparatus than shafts may be used.

I claim:—

1. A cultivator comprising three spaced substantially parallel transverse bars, each bar having an arch near each end, a pair of shafts for the frame, said shafts being arranged on each side of the center of the bars above the arches of the front and central bar and below the arches of the rear bar, said shafts being pivoted to the arches of the rear and central bars, a pair of handles connected with the central bar between the arches and extending rearwardly above the central portion of the rear bar, a plate connecting the arches of the rear bar, a stirrup on the plate for each handle, the handle passing through the stirrup, a bar connecting the handles, straps connecting the ends and central portions of the front and central bars, straps connecting the ends and centers of the central and rear bar, a link connecting each handle with the front bar, said links being crossed, teeth on the bars, and a runner at each end of the frame, the front end of each runner being pivoted to the front bar near its ends, and a hanger connecting the rear end of each runner to the rear bar, said runners being parallel.

2. A cultivator, comprising a frame composed of a front, a central and a rear bar arranged substantially parallel and transverse to the direction of movement of the cultivator, a pair of straps connecting the central to the rear bar, said straps being pivoted to the center of the central bar and diverging toward the rear bar, each bar having an arch near each end, a shaft pivoted to each arch of the rear bar and extending over the arches of the other bars, a pivotal connection between each shaft and the arch of the central bar, a handle pivoted to the central bar on each side of its center and extending over the rear bar, a plate connecting the arches of the rear bar, a stirrup on the plate for each handle, a connection between the handles, a swinging connection between the front and the central bar, a runner at each side of the frame, said runners being parallel, and a pivotal connection between the ends of each runner and the first and rear bars, and teeth on the bars.

3. A cultivator comprising a pair of transverse rigidly connected spaced bars, a front bar connected to the said bars for swinging movement transversely of the frame, a runner at each side of the frame and transverse to the bars, a pivotal connection between the rear ends of the runners and the rear bar, a pivotal connection between the front ends of the runners and the front bar, shafts connected to the first named bars, a pair of handles pivoted to the central bar, a connection between the handles, and a link connecting each handle with the first bar, said links being crossed to cause the front bar to swing in the same direction with the handles, and teeth on the bars, one of the said teeth being directly in front of each runner.

4. A cultivator comprising a frame consisting of a pair of transverse rigidly connected spaced bars, a front bar connected to the said bars for swinging movement transversely of the frame, a runner at each side of the frame and transverse to the bars, a pivotal connection between the rear ends of the runners and the rear bar, a pivotal connection between the front ends of the runners and the front bar, shafts connected to the first named bars, a pair of handles pivoted to the central bar, a connection between the handles, and a link connecting each handle with the first bar, said links being crossed to cause the front bar to swing in the same direction with the handles, and teeth on the bars.

5. A cultivator comprising a pair of transverse rigidly connected spaced bars, a front bar connected to the said bars for swinging movement transversely of the frame, a runner at each side of the frame and transverse to the bars, a pivotal connection between the rear ends of the runners and the rear bar, a pivotal connection between the front ends of the runners and the front bar, means for drawing the frame connected with the first named bars, a pair of handles mounted to swing on the first named bars, a link connecting each handle with the front bar, said links being crossed, a connection between the handles, and cultivating means supported by the bars.

6. A cultivator comprising a pair of transverse rigidly connected spaced bars, a front bar connected to the said bars for swinging movement transversely of the frame, a runner at each side of the frame and transverse to the bars, a pivotal connection between the rear ends of the runners and the rear bar, a pivotal connection between the front ends of the runners and the front bar, means for drawing the frame connected with the first named bars, handles pivoted to the first named bars, a connection between the handles and the front bar for swinging said bar in the same direction as the handles, and cultivating teeth on the bars.

ROBERT CALVIN DOUGAN.

Witnesses:
M. E. EVERHART,
B. G. EVERHART.